United States Patent Office 3,296,242
Patented Jan. 3, 1967

3,296,242
METAL-ACYLOXY COMPOUNDS AND METHOD
OF PREPARING SAME
John H. W. Turner, Chapel-en-le-Frith, Eric W. Downs, Hyde, and Samuel E. Harson, Culcheth, near Warrington, England, assignors to Hardman & Holden Limited, Manchester, England, a British company
No Drawing. Filed Feb. 18, 1963, Ser. No. 259,396
Claims priority, application Great Britain, Feb. 23, 1962, 7,091/62
9 Claims. (Cl. 260—105)

This invention relates to methods of preparation of metal-organic compounds and to new metal-organic compounds.

According to the invention, metal-organic compounds are obtained by condensing alkoxides or aryloxides of trivalent elements with acyloxides of divalent metals or radicals.

The alkoxides or aryloxides may be used in the form of condensed compounds such as polyoxoaluminium alkoxides or aryloxides, or alkyl or aryl metaborate or polyborate esters.

According to a further feature of the invention, metal-organic compounds are obtained by reacting certain metal oxides, e.g., litharge, with polyoxoaluminium acylates.

The trivalent elements whose alkoxides may be used include especially aluminium and boron. Aluminium may conveniently be used in the form of an alkoxide derived from a readily volatile alcohol, e.g. the isopropoxide or s-butoxide.

Boron may be used in the form of alkyl or aryl ortho borates $B(OR)_3$, metaborates $(OBOR)_3$, and polyborates having boron atoms and alkoxide or aryloxide groups in a proportion of up to about 4:3. For convenience of processing the preferred alkoxide group are the iso-butoxide and the normal butoxide group.

The divalent metals and radicals include magnesium, calcium, strontium, barium, zinc, cadmium, iron, cobalt, nickel, lead, copper, manganese and the zirconyl radical. They may be used in the form of salts of monocarboxylic acids. Suitable monocarboxylic acids include acetic acid, propionic acid, methacrylic acid, tall oil and tall oil fatty acids, naphthenic acids, and synthetic carboxylic acids in the range $C_7$–$C_{24}$. A minor proportion of the metal salts may be salts of dicarboxylic acids. Suitable dicarboxylic acids include maleic acid, phthalic acid, sebacic acid, azelaic acid and dimerised fatty acids.

The products of the invention are compounds which contain a trivalent element, one or more divalent elements or radicals, at least one organic acid radical and in some cases at least one alkoxy, aryloxy or alkylated aryloxy group, and in which the divalent and trivalent atoms are probably linked through oxygen atoms. Where two or more organic acid radicals are present, they may be the same or different.

The products have a high metal content with organic acid radicals present in the proportion of 0.5 to 1.5 equivalents per metal atom. As a result the products have a higher acid acceptance potential than conventional metallic soaps.

They vary in form from oily liquids to waxy, resinous or amorphous solids and in many cases the products have good solubility in or compatibility with hydrocarbon or ester type media or with certain polar products such as P.V.C. for which they are effective heat stabilizers and processing aids.

The products also differ from conventional metallic soaps in their physical form and ease of solubility, e.g. it is possible to prepare 1:1:2 zinc/aluminium/mono carboxylic acid compounds with or without ester which exist as oily liquids immediately miscible with hydrocarbons and esters, whereas conventional soaps of either metal with higher proportions of acid may be tough plastic solids with limited solubility in solvents or media of this type.

As a further example, it is possible to obtain as oily liquids 1:1:1 lead/aluminium/monocarboxylic acid or zinc/aluminium/monocarboxylic acid compounds with 0–20% of diluent. Compounds of this type are thought to have the structure

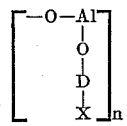

where X is an organic acid radical and D is a divalent metal.

In many cases the products have outstanding pigment and surface wetting characteristics and are of utility in surface coatings, metal lubricants, elastomers and plastic compositions.

In the course of preparation volatile or non-volatile esters may be formed which may be removed by distillation at normal pressures or retained as diluent in the final product, depending on the application envisaged. Processing may be carried out with no added solvent, or a proportion of volatile or non-volatile solvent may be used to assist processing.

Compounds according to the invention may be prepared from an aluminium alkoxide or aryloxide or the aluminium alkoxide or aryloxide may initially be condensed, for example as described in British Patent 825,878, and 806,113, to form a polyoxo aluminium compound. Such compounds are often designated polyoxyaluminium compounds in the United States, but reference to the British patents will make readily apparent the actual chemical compounds to which the term "polyoxo" has been applied to the present description.

The condensation of divalent metal compounds with aluminium or boron alkoxides may be effected by heating the compounds together, with or without water, and if necessary distilling off any alcohol or volatile ester which is liberated. The reaction may result in the formation of volatile or non-volatile ester. For example, non-volatile ester is formed at reaction temperatures up to about 240° C. when an aluminium alkoxide or partially condensed aluminium alkoxide is reacted with a neutral, basic or acidic soap of a divalent metal and a monocarboxylic acid containing more than 7 carbon atoms, e.g. tall oil fatty acids, and volatile esters are formed when an aluminium alkoxide or partially condensed aluminium alkoxide is reacted with a divalent metal salt containing for example, 1 mol. of acetic or propionic acid and 1 mol. of higher monocarboxylic acid e.g. naphthenate or tallate.

The acyloxides of divalent metals or radicals may be obtained from oxides, hydroxides or carbonates of the metals or radicals by treatment with carboxylic acids, the reaction product then being reacted with an aluminium or boron alkoxide. Up to 1.5 mol. of water per aluminium atom may be introduced either as free water or as water of reaction formed in situ during the previous preparation of neutral, basic or acidic soaps of divalent metals, in order to effect condensation of the aluminium alkoxide.

Certain divalent metal oxides, especially litharge, may be reacted directly with polyoxo aluminium acylates. In these reactions a small proportion, e.g. 1–2% of a glycol or diglycol half ether may be used to promote the reaction. Such oxides may also be reacted with compounds prepared according to the invention, whereby compounds containing one or more divalent metals may be obtained.

Some of the reactions concerned can be illustrated by the following equations wherein HX represents a monocarboxylic acid and Ac represents the acetate radical.

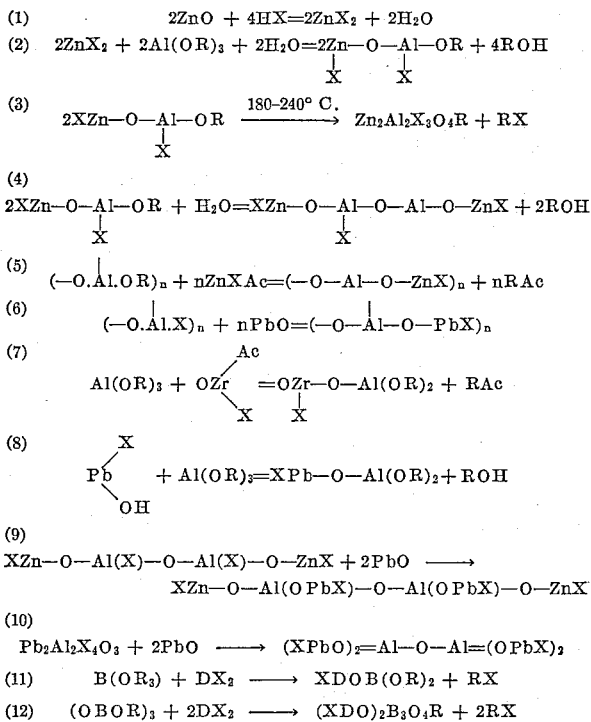

(1) $2ZnO + 4HX = 2ZnX_2 + 2H_2O$ (2) $2ZnX_2 + 2Al(OR)_3 + 2H_2O = 2Zn-O-Al-OR + 4ROH$ (with X substituents)

(3) $2XZn-O-Al-OR \xrightarrow{180-240°\,C.} Zn_2Al_2X_3O_4R + RX$ (4) $2XZn-O-Al-OR + H_2O = XZn-O-Al-O-Al-O-ZnX + 2ROH$ (5) $(-O.Al.OR)_n + nZnXAc = (-O-Al-O-ZnX)_n + nRAc$ (6) $(-O.Al.X)_n + nPbO = (-O-Al-O-PbX)_n$ (7) $Al(OR)_3 + OZr(Ac)(X) = OZr-O-Al(OR)_2 + RAc$ (8) $Pb(X)(OH) + Al(OR)_3 = XPb-O-Al(OR)_2 + ROH$ (9) $XZn-O-Al(X)-O-Al(X)-O-ZnX + 2PbO \longrightarrow XZn-O-Al(OPbX)-O-Al(OPbX)-O-ZnX$

(10) $Pb_2Al_2X_4O_3 + 2PbO \longrightarrow (XPbO)_2=Al-O-Al=(OPbX)_2$

(11) $B(OR)_3 + DX_2 \longrightarrow XDOB(OR)_2 + RX$

(12) $(OBOR)_3 + 2DX_2 \longrightarrow (XDO)_2B_3O_4R + 2RX$

To improve the storage stability of oily liquids obtained by condensation reactions with elimination of alcohol, it is preferred to remove final traces of the alcohol of reaction by the application of vacuum.

It is also possible to produce secondary products of reaction by reacting the primary products of condensation with additional acidic materials including dibasic acid anhydrides and dibasic acids.

With the dibasic acids or anhydrides, e.g. maleic anhydrides, it is thought that reaction occurs with the main oxygen-metal chain at temperatures up to about 120° C., while at higher temperatures and with unsaturated fatty acids adduct reactions can also occur.

By this secondary reaction procedure it is frequently much easier to introduce dibasic acid radicals including phthalic, sebacic and dimer fatty acid radicals into metallic soap structures than would be practically possible because of viscosity considerations if it were attempted to use the same dibasic acid materials directly in the course of synthesis. This secondary procedure permits the preparation of hard or tough gels if necessary by the use of masticating mills.

The invention is illustrated by the following examples:

EXAMPLE 1

162.8 gms. of zinc oxide (2 mols) were added to 1160 gms. (4 mols) of tall oil fatty acids. The mixture was allowed to react for 20 minutes with mechanical stirring without applied heat and the temperature was then raised to 100° C. under reflux.

204 gms. of aluminium isopropoxide were melted and pre-heated to 130° C. till clear and added slowly to the zinc tallate cooled to 80–85° C., under reflux. The product was held under reflux for 20 minutes then changed to distillation. After heating to 178° C. a distillate of 199.5 mls. of isopropyl alcohol was obtained.

The product was cooled to 138° C. and a further addition was made of 204 gms. of liquid aluminium isopropoxide to give an increased viscosity. The product was heated to 213° C. in two hours when a total isopropyl alcohol distillate of 367 mls. was obtained.

The final product was obtained as a mobile clear oily, pale brown liquid in a yield of 1866 gms.

Analysis of the product indicated the composition $Zn_2Al_2O_3X_3OR$ with an isopropyl tallate ester content of 22.3%.

EXAMPLE 2

Distilled tall oil fatty acids 928 gms. and isopropyl alcohol 61 mls. were mixed, 130.2 gms. of zinc oxide were added and the mixture stirred for 30 minutes without heating. Heat was applied and the temperature raised to 85° C. in 1½ hours when a completely clear solution was obtained. This was cooled to 70° C. and 217.6 gms. of aluminium tri-isopropoxide melted and preheated to 130° C. were added in 30 minutes at a temperature which maintained moderate reflux. The mixture was heated for a further 30 minutes under reflux after which isopropyl alcohol was distilled off at a temperature of 130° C. and a distillate volume of 250 ml.

Heating was discontinued and 108.8 gms. of premelted aluminium isopropoxide at 130° C. were added under reflux. The contents of the flask were cooled to 70° C. and a mixture of water 14.4 mls. and isopropyl alcohol 25.6 mls. was added under reflux in 20 minutes and held under reflux for 30 minutes.

The mixture was distilled at 180° C. when a further 180 mls. of isopropyl alcohol were distilled off, finally under vacuum.

A yield of 1116 gms. was obtained in the form of a clear oily mobile liquid. This corresponds fairly closely to that required by the composition $Zn_2Al_2O_3X_4$.

Analysis of the product showed it to be free of ester. The product was treated in part with 0.05% cobalt in the form of the naphthenate and applied to glass and metal panels by film applicator. Overnight the film dried to a clear glossy tough hard film.

EXAMPLE 3

446.4 gms. of litharge (PbO) were slurried in a flask containing 553 gms. of mineral spirit, 2 gms. of tall oil fatty acid and 5 gms. of ispropyl alcohol. An addition was made of 580 gms. (2 mols) of tall oil fatty acids with mechanical stirring under reflux. The mixture was allowed to react for 30 minutes without applied heat and the temperature was then raised to 95° C.

204 gms. of aluminium isopropoxide were pre-melted, heated to 130° C. until clear, cooled to 90° C. and mixed with 60 gms. of isopropyl alcohol. This mixture was added slowly to the lead tallate solution held at 85° C. giving a reaction mixture of low viscosity. The product was held under reflux for 20 minutes then changed to distillation and heated to a final reaction temperature of 195° C. in 2½ hours. A distillate of 550 gms. containing 335 gms. of mineral spirit was obtained.

The product had the formula

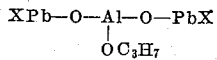

$$XPb-O-Al-O-PbX$$
$$\qquad\quad |$$
$$\qquad OC_3H_7$$

when X is is the tallate radical.

EXAMPLE 4

Zinc oxide 122 gms. were slurried in a mixture of mineral oil Carnea 25–200 gms., 6% zinc naphthenate 1 gm. and isobutyl alcohol 6 gms. An addition was made of 125 mls. toluene and 50 mls. of isobutyl alcohol and to the contents 222 gms. of propionic acid were added with no applied heat.

The temperature was raised to 120° C. when distillation began and continued to a temperature of 180° C. for 1½ hours while 114 mls. of solvent were recovered.

310 gms. of pre-melted aluminium isopropoxide were added and reaction continued at 185–205° C. for one hour and 210° C. ∓5° C. for a further two hours while 254 mls. of distillate of Refractive Index 1.393 (isopropyl propionate R.I.=1.3935) were obtained. Some evolution of carbon dioxide and propylene was detected at this stage.

One third of the product was removed to yield a pasty opaque yellow solid.

To the remaining part of the product containing one gm. equivalent of aluminium there were added 290 gms. 1 mol. of distilled tall oil fatty acids and reaction was continued while raising the temperature from 100° C. to 220° C. during which time 67 mls. of distillate, mainly isopropyl alcohol R.I. 1.3790 was obtained.

A yield of propionic zinc alumino tallate isopropoxide of 599 gms. was obtained in the form of a hazy brown oily liquid, formula $PrZN.O.Al(X).OC_3H_7$.

EXAMPLE 5

Polyoxo aluminium tallate of composition $(OAlX)_n$, 70% solution Carnea 25 oil, was made according to patent specification 825,878 from distilled tall oil fatty acids, equivalent weight 290.

To 476 gms. of this oily solution containing one gm. equivalent of aluminum, 223 gms. of litharge were added with mechanical stirring together with 7 gms. of ethyl cellosolve and the reaction mixture heated to 140° C. for three hours.

A clear brown oily liquid was obtained containing 3.85% aluminium and 29.2% lead, containing the reaction product which is thought to have the organic metallo aluminoxane structure $(-O-Al-O-Pb-X)_n$.

EXAMPLE 6

Polyoxo aluminium tallate $(OAlX)_n$ was made according to patent specification 806,113 by the thermal condensed of aluminium isopropoxide 1 mol. and tall oil fatty acids 2 mols. (580 gms.) after removal of released isopropyl alcohol by distillation. The product contained 50% of isopropyl tallate ester and had an aluminium content of 4.1%.

333 gms. of the above product were weighed and 112 gms. of litharge added. The product was heated to 180° C. with stirring when a clear brown mobile oily liquid was obtained containing 24% lead and 3.15% aluminium in a yield of 433 gms.

The metal compound contained in the product is thought to have an organo metallo aluminoxane structure.

EXAMPLE 7

66.6 gms. of poly oxo aluminium tallate containing 50% isopropyl tallate, as described in Example 6 was mixed with litharge 2.25 gms. and zinc oxide 7.3 gms. The mixture was heated to 180 C.±5° C. with stirring for three hours when a white colloidal, oily liquid was obtained. On standing slight sedimentation occurred with a small top layer of oily liquid.

EXAMPLE 8

1020 gms. of aluminium isopropoxide and 255 gms. of Carnea oil 25 were pre-melted and heated to 140° C. for ½ hour. The solution was cooled to 80° C. and 300 gms. of glacial acetic acid added slowly with stirring under reflux.

The reaction mixture was heated by means of an oil bath held at 140° C. for four hours, while 351 mls. of distillate were collected consisting of replaced isopropyl alcohol.

The oil bath temperature was then raised to 180° C. with distillation of isopropyl acetate. Reaction temperature was raised to 220° C. over a period of 4½ hours when 594 mls. of distillate were collected. The product yield was 733 gms. of polyoxo aluminium isopropoxide.

Zinc tallate acetate was prepared by reacting 2½ mols. of zinc oxide (203.5 gms.) with 2½ mols. of distilled tall oil fatty acids (725 gms) and 150 gms of glacial acetic acid in the presence of 10 mls. of isopropyl alcohol.

After heating to 165° C. a distillate of 56 mls. was obtained with a solid yield of 1028 gms.

153 gms. of the polyoxo aluminium isopropoxide were reacted with 413 gms. of the zinc tallate acetate while heating from 140° C. when distillation of isopropyl acetate commenced and holding at 200–220° C. for 2½ hours. 47 mls. of distillate were obtained together with 524.6 gms. of a hazy viscous oily liquid.

EXAMPLE 9

928 gms. of distilled tall oil fatty acids and 61 mls. of isopropyl alcohol were mixed at room temperature. An addition was made of zinc oxide 65.1 gms. and litharge 178.6 gms. with stirring which was continued without heating for 20 minutes. Heat was applied and the temerature raised to 80° C. in one hour and held at 85–90° C. for 1½ hours.

217.6 gms. of aluminium isopropoxide were pre-melted and heated to 130° C. and added slowly under reflux and held under reflux for 20 minutes. The apparatus was changed to distillation and 247 mls. of isopropyl alcohol were distilled off while raising the temperature from 90° C. to 125° C. in one hour. The product was cooled to 90° C. and 108.8 gms. of pre-heated aluminum isopropoxide at 130° C. were added under reflux in 15 minutes after which an addition was made of 14.4 gms. of water and 25.6 mls. of isopropyl alcohol, also under reflux at a temperature of 80° C. The reaction mixture was held under reflux for 20 minutes then changed to distillation.

The temperature was raised from 80° C. to 186° C. in 2½ hours after which vacuum was applied for 10 minutes. A total distillate of 427 mls. was recovered and the product yield was 1238.1 gms. in the form of a clear light brown oily liquid. This compares with a theory yield of 1228 gms. required for the product $PbZnAl_2O_3X_4$. Analysis showed that the product was substantially free of ester.

EXAMPLE 10

A condensed lead aluminium tallate was made by the procedure used in Example 9, but using 357.1 gms. of litharge in place of the mixed oxides and a final reaction temperature of 180° C.

A distillate of 425 mls. was obtained together with 1354.9 gms. of a product in the form of a brown clear oily liquid formula $Pb_2Al_2O_3X_4$.

EXAMPLE 11

928 gms. of distilled tall oil fatty acids and 61 mls. of isopropyl alcohol were mixed at room temperature. An addition was made of calcium hydroxide $Ca(OH)_2$ 60 gms. and zinc oxide 65.1 gms. and stirring continued for 20 minutes without applied heat. The temperature was raised to 90° C. in 50 minutes and held under reflux for 2 hours. The product was cooled to 75° C., and 326.4 gms. of aluminium isopropoxide were pre-heated to 130° C. and added in 40 minutes. The product was held under reflux for 40 minutes then changed to distillations. The temperature was raised from 84° C. to 200° C. in two hours and to 230° C. in 2½ hours, and held for a further one hour with vacuum applied for the last 10 minutes.

A distillate yield of 397.5 mls. was obtained and 1093.4 gms. of a plastic solid, Formula $CaZnAl_2O_3X_4$.

A 60% solution in mineral spirits was treated with cobalt naphthenate at 0.05% cobalt on the solids. Films of this solution were applied to glass and metal panels by film applicator. They dried to hard tough glossy film overnight.

EXAMPLE 12

192 gms. of cobalt hydroxide (2 mols) were slurried with mechanical stirring in 400 gms. of mineral spirit. An addition was made of 732 gms. (3 mols) of naphthenic acid mixed with 490 gms. of mineral spirit.

The product was allowed to react for 30 minutes with mechanical stirring and with no applied heat, then the temperature was raised to 108° C. and two mols, 36 cc. of water was removed in a Dean and Stark attachment.

A solution of 204 gms. of aluminium isopropoxide in 200 gms. of mineral spirits was added under reflux at a reaction temperature of 87–89° C. and held under reflux for 20 minutes. The apparatus was changed to distillation and the reaction temperature raised to 147° C. 450 mls. of distillate containing isopropyl alcohol with some mineral spirit were distilled off and the solution filtered through cloth and dicalite to give a low viscosity blue purple solution containing 6.2% cobalt and 2.78 mols. of naphthenic acid attached to metal, the remaining 0.22 mols. of acid being present as the isopropyl ester. The product is suitable for use as a drier for paints and surface coatings, formula XCo—O—Al(X)—O—CoX.

EXAMPLE 13

580 gms. of 2-ethyl hexoic acid were weighed into a flask. An addition was made of 162.8 gms. of zinc oxide and the temperature raised to 86° C.

136 gms. of aluminium isopropoxide were pre-heated to 130° C. until clear and then added under reflux to the zinc octoate. A considerable increase in viscosity occurred so that the product could not be stirred. An addition was made of 313 gms. of mineral spirit and the reaction mixture was stirred and heated to 148° C. At this stage the product formed a gel and 215 mls. of distillate, mainly isopropyl alcohol, were distilled off. At a reaction temperature of 150° C. an addition was made of 68 gms. of liquid pre-heated aluminium isopropoxide when viscosity was considerably reduced.

The product was heated to 230° C. when a total distillate of 700 mls. was obtained as a mixture of isopropyl alcohol and mineral spirit together with 900 gms of a viscous oily liquid, formula XZn—O—Al(X)—OC$_3$H$_7$.

EXAMPLE 14

Polyoxo aluminium isopropoxide was made as a 66⅔% solution in Carnea 25 mineral oil by the following procedure:

1224 gms. of aluminium isopropoxide were pre-melted and heated to 140° C. An addition was made of 306 gms. of Carnea 25 mineral oil and the solution cooled to 70° C. A mixture of water 72 gms. and isopropyl alcohol 128 mls. was added dropwise under reflux with stirring and held under reflux for a further 45 minutes. The product was then distilled to a flask temperature of 122° C., cooled to 70° C. and a further addition made of a mixture of water 36 gms. isopropyl alcohol 64 mls. The reaction mixture was held under reflux for one hour then changed to distillation. The temperature was raised to 95° C. in four hours when an isopropyl alcohol distillate of 858 mls. was obtained. Heating was continued to a final reaction temperature of 180° C. which was held for 30 minutes. A total distillate of 1025 mls. was obtained together with a product yield of 882 gms.

Zinc acetate naphthenate was prepared by addition of 1 mol. zinc oxide 81.4 gms. to 1 mol. of naphthenic acid 274 gms. and 3.5 mls. of isopropyl alcohol at room temperature. The dispersion obtained was heated to 70° C. and 60 gms. of glacial acetic acid (1 mol) was added. The reaction mixture increased in viscosity and became transparent on heating to 98° C. in 1¾ hours. Heating was continued and distillation of water commenced at 102° C. in 125 minutes and was completed in 2½ hours at 160° C. when a distillate of 21.5 mls. water and isopropyl alcohol was obtained with a product yield of 393 gms.

The zinc naphthenate acetate was cooled to 120° C. and 153 gms. of the above 66⅔% solution of polyoxo aluminium isopropoxide were added. On raising the temperature to 150° C. distillation of isopropyl acetate commenced. The temperature was raised to 218° C. in 2½ hours and held at 215–220° C. for a further 45 minutes when a yield of 75 mls. of isopropyl acetate was obtained, together with 474.5 gms. of zinc naphthenate aluminoxane in the form of a dark reddish brown oily liquid.

EXAMPLE 15

400 gms. of linseed oil fatty acids were weighed out. An addition was made of 81.4 gms. of zinc oxide and the product heated to 65° C. when solidification occurred. A further addition was made of 43 gms. of methacrylic acid mixed with 20 gms. of linseed oil fatty acids to give a total of two mols. of monocarboxylic acid. The product was then in the form of a clear liquid.

136 gms. of aluminium isopropoxide pre-heated to 130° C. until clear was added under reflux at a reaction temperature of 60° C.–80° C. and resulted in a viscosity increase. The apparatus was changed to distillation and the product heated to 146° C. while 124 mls. of isopropyl alcohol were distilled off. A further addition was made of 68 gms. of liquid pre-heated aluminium isopropoxide at a reaction temperature of 124° C.–118° C. resulting in an increase in viscosity. The apparatus was changed to distillation and the product heated to a final reaction temperature of 220° C. when a further 23 mls. of distillate were obtained together with 631 gms. of a soft gel.

Analysis of the product showed 1.68 mols. of carboxylic acid per two metal atoms, the remaining 0.32 mols having been converted to the isopropyl ester.

EXAMPLE 16

700 gms. of water white rosin and 450 gms. of mineral spirit were made into solution at 80° C. An addition was made of 81.4 gms. of zinc oxide resulting in an exothermic reaction to 110° C. The solution was heated to 150° C. when 10 mls. of water were distilled off.

204 gms. of aluminium isopropoxide were pre-heated to 130° C. until a clear liquid was obtained which was added to the zinc resinate solution at a temperature of 150° C. to give a thick homogeneous liquid to which an addition was made of 150 gms. of mineral spirit, followed by 18 gms. of water in 200 mls. of isopropyl alcohol, at a reaction temperature of 137° C.–115° C. At this temperature a heterogeneous mass was formed which cleared to a homogeneous liquid on heating to 136° C.

The product was distilled to a reaction temperature of 198° C. when 739 mls. of distillate were obtained. An addition was made of mineral spirit to give 1734 gms. of a 50% final product in the form of a clear solution of low viscosity.

The solution has good compatibility in alkyd resins and in linseed stand oil and 1:1 blends yielded films free from after-tack normally found with zinc resinate in similar blends.

EXAMPLE 17

290 gms. (1 mol) of distilled tall oil fatty acids were heated to 70° C. An addition was then made under reflux of 81.4 gms. of zinc oxide and the reaction mixture heated to 87° C. when an addition was made of 74 gms. of propionic acid which yielded a clear melt of zinc tallate propionate.

204 gms. of aluminium isopropoxide pre-heated at 130° C. to give a clear liquid were added at a reaction temperature of 95° C. with simultaneous distillation of isopropyl alcohol. The viscosity increased almost to gelation but heating further to 140° C. yielded a viscous liquid and 125 mls. of isopropyl alcohol distillate. At this stage an addition was made of 290 gms. (1 mol) of distilled tall oil fatty acids with a reduction in product viscosity. Reaction was continued to 197° C. with the removal of a total of 206 mls. of isopropyl alcohol and left 763 gms. of a product in the form of a fairly mobile oily liquid.

Analysis of the product showed a total of 2.7 mols. of acid in combination with two metal atoms, formula Pr—Zn—OAl(X)$_2$.

EXAMPLE 18

580 gms. (2 mols) of tall oil fatty acids were heated to 70° C. An addition was made of 81.4 gms. of zinc oxide and the mixture reacted at 80–85° C. to give a clear soap. To this there were added 18 gms. of water and 218 gms. of m-cresol followed under reflux by 408 gms. of liquid aluminium isopropoxide in consecutive amounts. When about ⅔ of the aluminium isopropoxide had been added viscosity increased, addition of aluminium isopropoxide was stopped and the apparatus changed to distillation and 207 mls. of isopropyl alcohol distilled off. After addition of half the remaining aluminium isopropoxide a gel formed and the product was again distilled to a reaction temperature of 140° C. The remainder of the aluminium isopropoxide was added at this temperature and the product reacted to a final temperature of 200° C.

The product, 961 gms. was obtained in the form of a low viscosity liquid, formula $$XZn—O—Al(X)—OC_6H_4CH_3.$$

EXAMPLE 19

274 gms. of stearin and 337 gms. of dioctyl phthalate were heated to 100° C. An addition was made of 40.7 gms. of zinc oxide and the product reacted to 160° C. when 5 mls. of water were recovered.

An addition was made of 102 gms. of liquid aluminium isopropoxide pre-heated to 130° C. the reaction temperature during the addition being 125° C.-105° C. A further addition was then made of 13.5 gms. of water and 50 mls. isopropyl alcohol at a reaction temperature of 100° C. to 90° C.

The product was then heated to a final temperature of 220° C. and obtained as a heterogeneous thick liquid on cooling, 681 gms.

EXAMPLE 20

362 gms. of water wetted zirconyl carbonate paste (1 mol) were slurried with 130 mls. of water. An addition was then made of 120 gms. (2 mols) of glacial acetic acid with stirring. The syrupy zirconyl acetate solution so obtained was washed into a flask with 37 mls. of water. An addition was made of 284.5 gms. of stearin and the product reacted at about 100° C. was pasty. Reaction and distillation of water/acetic acid was continued to a reaction temperature of 126° C. when 409 mls. of distillate were obtained containing on titration 60.5 gms. of acetic acid. At this stage the product has an ash content of 26.2%.

To 225 gms. of this product an addition was made of 102 gms. of liquid aluminium isopropoxide pre-heated to 130° C. The product thickened to a solid condition. An addition was made of 50 gms. of mineral oil, Carnea 15, which reduced viscosity somewhat. The product was refluxed at 90° C. for one hour and then distilled to a reaction temperature of 132° C. when 57 mls. of distillate mainly isopropyl acetate, was obtained and the product thinned out to an easily stirrable, oily liquid. After cooling overnight the product was reheated to 125° C. when a further 23 mls. of distillate were obtained together with 294 gms. of waxy solid, formula $$St—Zr(O)—O—Al(OC_3H_7)_2.$$

A 2% solution of the product in mineral spirit was used to water-proof cotton and found to give good results in waterproofing and in resistance to drycleaning.

EXAMPLE 21

To 202.9 gms. of the product of Example 20 (0.345 mols) an addition of 98.2 gms. of stearin was made at 100° C. and the product heated to 200° C. to yield a brown waxy solid.

A 2% solution of this product in mineral spirit imparted a water-repellent finish to cotton textiles and resisted drycleaning solvents.

EXAMPLE 22

548 gms. (2 mols) of tallow fatty acids were heated to 70° C. An addition was made of 81.4 gms. of zinc oxide and the product reacted and dried to 145° C.

204 gms. of aluminium isopropoxide liquefied and heated to 130° C. were added over a period of two hours with a reaction temperature rising from 120° C–160° C. and the apparatus changed to distillation and an addition made of water 13.5 gms. in 25 mls. of isopropyl alcohol. At this stage the product formed a gel. Reaction temperature was raised to 200° C. when the product liquefied. A further addition was made of 13.5 gms. of water and 25 mls. of isopropyl alcohol on the down heat from 145° C.–123° C.

The reaction temperature was finally raised 210° C. when 694 gms. of product were obtained in the form of a soft rubbery solid at room temperature.

Analysis of the product showed that 1.62 mols. of the fatty acid from a total of 2 mols. remained attached to two metal atoms with 0.38 mols. in the form of the isopropyl tallowate.

EXAMPLE 23

Two mols of anhydrous zinc acetate tallate at 165° C. were mixed with one mol of isobutyl metaborate. The temperature was raised to 185° C. in 1 hour and distillation of isobutyl acetate commenced. The temperature was further raised to 205° C. in two hours and 214° C. in three hours and held for 1 hour. Vacuum was applied in the latter part of the reaction and 230 cc. of isobutyl acetate was collected. The product was an oily liquid and was found on analysis to contain 9% isobutyl tallate.

EXAMPLE 24

870 gms. (3 mols) of tall oil fatty acid were mixed with 291.5 (3 mols) of magnesium carbonate followed by 195 gms. of glacial acetic acid, the mixture reaching a temperature of 72° C. Reaction was continued to 107° C. when distillation of water of reaction, free water in the magnesium carbonate and excess acetic acid started. Reaction was continued to 200° C. when a distillate containing 109 gms. water and 27 gms. acetic acid was obtained. The product was cooled to 190° C. and 450 gms. of isobutyl metaborate were added slowly while cooling to 178° C. The temperature was raised to 184° C. when distillation of isobutyl acetate started. Heating was continued to 235° C. and a temperature of 235±5° C. held for 8 hours when a distillate of 343 cc. of isobutyl acetate was obtained.

The final product 1223 gms. was a clear resinous solid which could be fractured.

EXAMPLE 25

Two mols of anhydrous zinc acetate tallate at 140° C. were mixed with 1 mol of isobutyl orthoborate. The temperature was raised and distillation of isobutyl acetate started at 160° C. and was continued at a reaction temperature of 185° C. until 140 cc. of distillate was collected. Heating was continued to 200° C. and low vacuum was applied yielding 200 cc. of ester distillate. The reaction was completed by raising the temperature to 220° C. with a vacuum of 60 cm. when a total distillate of 263 cc. of isobutyl acetate was obtained. The product thinned out towards the end of the reaction and existed as a soft brown grease at 200° C. with little change on cooling to room temperature. The product yield was 776.2 gms.

EXAMPLE 26

700 gms. of the product of Example 2 $Zn_2Al_2X_4O_3$ in the form of a clear medium viscosity oil were mixed while stirring with 223 gms. of litharge PbO.

The temperature was slowly raised while stirring to 120° C. in 3 hours and 155° C. in 6 hours when some thickening was observed. Further heating to 180° C. in 6½ hours gave partial reaction and increasing transparency. The reaction was completed by heating to 195° C. in 6¾ hours and holding for 40 minutes, yielding a clear light brown moderately viscous oil with a small amount of unreacted litharge.

EXAMPLE 27

1345 gms. of the product of Example 10 was heated to 70° C. in a stirred reaction flask and an addition was made of 357.1 gms. of litharge.

The mixture was heated with stirring to 155° C. when thickening was observed and finally to 200° C. for 2 hours when a clear liquid was obtained which solidified on cooling.

EXAMPLE 28

580 gms. of tall oil fatty acid and 38.2 cc. of isopropyl alcohol were mixed while stirring with 128.4 gms. of cadmium oxide. A good dispersion of the oxide was obtained at 20° C. and the temperature was raised cautiously to 95° C. under reflux. The product reacted to a clear liquid with some increase in viscosity.

The product was cooled to 70° C. and 136 gms. of aluminium isopropoxide preheated to 130° C. was added to the system under reflux. The mixture became more viscous and partly spongy in appearance.

The apparatus was changed to distillation and the product distilled to a flask temperature of 130° C. and then cooled to 79° C. An addition was made of 9 gms. of water premixed with 16 cc. of isopropyl alcohol followed by 68 gms. of liquid aluminium isoproproxide preheated to 120° C.

After refluxing for 30 minutes the product was distilled to a flask temperature of 180° C. Total isopropyl alcohol distillate was 260 cc. and the product yield was 755 gms. The product was a clear light amber coloured liquid hot and cooled to a soft waxy solid.

The product was tested as a stabiliser for P.V.C. and gave good results.

EXAMPLE 29

267 gms. (1 mol) of stearin were melted and heated to 75° C. and an addition was made of 128.4 gms. of cadmium oxide.

The temperature rose to 88° C. to give a creamy paste. An addition was made of 60 gms. of glacial acetic acid over a period of 20 minutes giving a solid mass which melted slowly at 105° C. An addition of 60 gms. of isopropyl alcohol resulted in a reduction in viscosity and reaction was continued at 110° C. under reflux until a clear pale coloured solution was obtained.

The product was cooled to 92° C. and a mixture of aluminium isopropoxide 204 gms. and isopropyl alcohol 120 gms. was made while cooling down over a period of 20 minutes with distillation of some alcohol/water.

The distillate was returned to the product held at 83° C. resulting in an opaque viscous solution which was held under reflux for ½ hour.

Isopropyl alcohol was removed by slow distillation with reduction in viscosity and clarification of the product but as distillation continued viscosity increased again to a solid condition at 90° C. Heating was continued and viscosity reduced at a reaction temperature of 140° C. when a distillate of 436 cc. had been obtained. Reaction was continued to 160° C. when the product changed in appearance to a metallic grey and a total distillate of 450 cc. was obtained.

The final product was a grey solid. It was tested as a stabiliser in P.V.C. and found to give good results.

EXAMPLE 30

White spirit 390 gms. and cobalt hydroxide 192 gms. (2 mols) were mixed and a mixture of 480 gms. (2 mols) of naphthenic acid and 130 gms. of glacial acetic acid was added in ½ hour while raising the temperature to 100° C. The temperature was raised and distillation of water of reaction through a Dean and Stark attachment started at 102° C. At a flask temperature of 174° C. a water distillate of 85 cc. was obtained. The apparatus was changed to vacuum distillation and the product distilled to 184° C. flask temperature and 740 mm. vacuum when 470 cc. of white spirit distillate was obtained. The product was cooled to 174° C. and an addition made of 300 gms. of isobutyl metaborate over a period of 12 minutes. The mixture was heated and distillation of isobutyl acetate commenced at a flask temperature of 180° C. The product was reacted at 200–230° C. for 6 hours with recovery of 232 cc. of isobutyl acetate. Low vacuum was applied for 1½ hours at a reaction temperature of 210° C. with recovery of 297 cc. distillate.

An addition was made of 470 cc. white spirit to yield 1134.5 gms. of a low viscosity blue purple solution containing 10% cobalt. The product was found to be equivalent to standard cobalt driers as a drying catalyst.

EXAMPLE 31

500 gm. of the product of Example 2 was mixed with 17.5 gm. of maleic anhydride and heated at 120° C. for three hours. The product changed to a viscous, light brown liquid when hot and changed on cooling to a greasy solid.

What is claimed is:

1. A metal-organic compound which contains at least one trivalent element selected from the group consisting of aluminum and boron; at least one divalent member selected from the group consisting of magnesium, calcium, strontium, barium, zinc, cadmium, iron, cobalt, nickel, lead, copper, manganese and the zirconyl radical, the divalent and trivalent atoms being linked through oxygen atoms; and there being at least one acyloxy radical attached to a divalent metal and any residual valences of the trivalent element being satisfied by radicals selected from the group consisting of acyloxy and alkoxy radicals.

2. A metal-organic compound as defined in claim 1 and having the formula $$X-D-O-T-Z$$
$$\phantom{X-D-O-}|\phantom{-Z}$$
$$\phantom{X-D-O-}Y$$

where D is a member selected from the group consisting of magnesium, calcium, strontium, barium, zinc, cadmium, iron, cobalt, nickel, lead, copper, manganese and the zirconyl radical, T is an element selected from the group consisting of aluminum and boron, X is an acyloxy radical, Y is a radical selected from the group consisting of acyloxy radicals and alkoxy radicals, and Z is a radical selected from the group consisting of acyloxy radicals and alkoxy radicals.

3. A metal-organic compound as defined in claim 1 and having the formula $$X-D^1-O-T-O-D^2-Z$$
$$\phantom{X-D^1-O-}|\phantom{-O-D^2-Z}$$
$$\phantom{X-D^1-O-}Y$$

where $D^1$ and $D^2$ are members selected from the group consisting of magnesium, calcium, strontium, barium, zinc, cadmium, iron, cobalt, nickel, lead, copper, manganese and the zirconyl radical, T is an element selected from the group consisting of aluminum and boron, X is an acyloxy radical and Y is a radical selected from the group consisting of acyloxy radicals and alkoxy radicals, and Z is a radical selected from the group consisting of acyloxy radicals and alkoxy radicals.

4. A metal-organic compound as defined in claim 1 and having the formula $$X-D^1-O-T-O-T-O-D^2-Y$$
$$\phantom{X-D^1-O-}|\phantom{-O-T-O-}|\phantom{-D^2-Y}$$
$$\phantom{X-D^1-O-}X\phantom{-O-T-O-}X$$

where $D^1$ and $D^2$ are members selected from the group consisting of magnesium, calcium, strontium, barium, zinc, cadmium, iron, cobalt, nickel, lead, copper, manganese and the zirconyl radical, T is an element selected from the group consisting of aluminum and boron, X is an acyloxy radical and Y is a radical selected from the group consisting of acyloxy radicals and alkoxy radicals.

5. A process of preparing metal-organic compounds, comprising heating a substance selected from the group consisting of aluminum and boron alkoxides of alcohols of up to four carbon atoms, polyoxo-aluminum alkoxides of alcohols of up to four carbon atoms, with a substance selected from the group consisting of acyloxides of magnesium, calcium, strontium, barium, zinc, cadmium, iron, cobalt, nickel, lead, copper, manganese and the zirconyl radical, and continuing the heating until condensation has been effected.

6. The process of claim 5 in which the alkoxide is aluminum isopropoxide.

7. The process of claim 5 in which alkoxide is aluminum secondary butoxide.

8. A process as claimed in claim 5, in which the acyloxide is a double salt of two monocarboxylic acids.

9. A process as claimed in claim 5 in which the condensation is effected by heating the compounds together and distilling off any alcohol and volatile ester which is liberated.

References Cited by the Examiner

UNITED STATES PATENTS 2,918,494   12/1959   Closson et al. _____ 260—414

CHARLES B. PARKER, *Primary Examiner.*

A. H. SUTTO, *Assistant Examiner.*